(12) United States Patent
Zielbauer

(10) Patent No.: US 7,017,067 B2
(45) Date of Patent: Mar. 21, 2006

(54) METHOD AND BUS SYSTEM FOR SYNCHRONIZING A DATA EXCHANGE BETWEEN A DATA SOURCE AND A CONTROL DEVICE

(75) Inventor: Jürgen Zielbauer, München (DE)

(73) Assignee: Infineon Technologies AG, Munich (DE)

( * ) Notice: Subject to any disclaimer, the term of this patent is extended or adjusted under 35 U.S.C. 154(b) by 573 days.

(21) Appl. No.: 10/186,138

(22) Filed: Jun. 28, 2002

(65) Prior Publication Data

US 2003/0014680 A1 Jan. 16, 2003

(30) Foreign Application Priority Data

Jun. 28, 2001 (DE) ................................ 101 31 307

(51) Int. Cl.
- *G06F 1/12* (2006.01)
- *H04L 7/00* (2006.01)
- *H04J 3/06* (2006.01)

(52) U.S. Cl. ...................... 713/401; 713/400; 713/500; 713/503; 375/354; 375/356; 370/519

(58) Field of Classification Search ................ 713/400, 713/401, 500, 503; 375/356
See application file for complete search history.

(56) References Cited

U.S. PATENT DOCUMENTS

| | | | |
|---|---|---|---|
| 5,258,660 A * | 11/1993 | Nelson et al. .............. 327/141 |
| 5,298,866 A * | 3/1994 | Kaplinsky ................... 327/261 |
| 5,852,640 A * | 12/1998 | Kliza et al. ................. 375/356 |
| 6,272,539 B1 * | 8/2001 | Cuomo et al. .............. 713/502 |
| 6,289,468 B1 * | 9/2001 | Godfrey ..................... 713/401 |
| 6,552,998 B1 * | 4/2003 | Matsunaga .................. 370/228 |
| 6,724,685 B1 * | 4/2004 | Braun et al. ................ 365/233 |
| 6,865,686 B1 * | 3/2005 | Krause et al. .............. 713/400 |
| 2002/0064185 A1 * | 5/2002 | Nakai et al. ................ 370/519 |

FOREIGN PATENT DOCUMENTS

| | | |
|---|---|---|
| DE | 197 10 971 A1 | 9/1998 |
| EP | 1 061 454 A1 | 12/2000 |
| WO | WO 99/50722 | 10/1999 |

\* cited by examiner

*Primary Examiner*—Lynne H. Browne
*Assistant Examiner*—James K. Trujillo
(74) *Attorney, Agent, or Firm*—Laurence A. Greenberg; Werner H. Stemer; Ralph E. Locher

(57) ABSTRACT

A method for synchronizing a data exchange between a data source and a control device is provided. A synchronization request signal is first transmitted via the bus system to the data source, which then measures a signal propagation time from the control device to the data source. In the data source, a transmission delay time is set which is dependent on the measured signal propagation time. Data which are to be transmitted are delayed by the transmission delay time. A bus system for synchronizing a data exchange is also provided. After receiving a synchronization request signal, the data source measures signal propagation times and sets a transmission delay time in a transmission delay device on the basis of the measured signal propagation times.

12 Claims, 3 Drawing Sheets

METHOD AND BUS SYSTEM FOR SYNCHRONIZING A DATA EXCHANGE BETWEEN A DATA SOURCE AND A CONTROL DEVICE

BACKGROUND OF THE INVENTION

Field of the Invention

The invention relates to a method and a bus system for synchronizing a data exchange between one or more data sources and a control device.

When transferring data between clocked electrical assemblies, high-frequency transfer speeds and long bus lengths result in unavoidable time delays which can be outside one clock period. In this case, the data from a data source normally arrive at the data receiver later and later the further the distance between the data source and the receiver. The delay causes the synchronization of data signals and clock signals provided in the receiver to be lost.

A bus system normally has a control device for controlling the data transfer via the bus system. The bus systems are synchronized by providing data sources with delay elements which are used to delay the signals such that they can be synchronized to a clock signal, for example, when arriving at the control device.

The synchronization operation is performed with a control device by transmitting a synchronization signal, in response to which each of the data sources generates a response signal and returns it to the control device. The propagation time thus measured between transmission of the synchronization signal and reception of the response signal is approximately twice the signal propagation time via the bus system. The measured propagation time is converted into a delay-time used to delay outgoing signals in the respective data source in order to synchronize the latter to a reference clock. When the synchronization operation has ended, the latencies of all the data sources, i.e. the time after which data are available for further processing or forwarding in the control device, are not only known but also are identical for all the data sources connected in a bus system.

SUMMARY OF THE INVENTION

It is accordingly an object of the invention to provide a method and a bus system for synchronizing a data transfer which overcome the above-mentioned disadvantages of the heretofore-known methods and bus systems of this general type and which can be used to improve the synchronization of a data transfer and where the data sources and control devices connected to the bus system are constructed in a simple way.

With the foregoing and other objects in view there is provided, in accordance with the invention, a method for synchronizing a data exchange between a data source and a control device via a bus system, the method includes the steps of:

transmitting, via the bus system, a synchronization request signal to the data source;

transmitting a synchronization signal with the data source;

receiving a response signal arriving as a consequence of the synchronization signal;

measuring, with a synchronization device in the data source, a time difference between transmission of the synchronization signal and reception of the response signal for providing a measured time difference;

determining a signal propagation time between the control device and the data source from the measured time difference; and setting a transmission delay time in the data source based on the signal propagation time such that data to be transmitted are delayed by the transmission delay time.

In other words, in accordance with one aspect of the invention, a method for synchronizing a data exchange between a data source and a control device via a bus system is provided. To this end, the signal propagation time between the control device and the data source is determined by virtue of a synchronization signal being transmitted by the data source, and a response signal arriving as a response to the synchronization signal being received. The time difference between transmission of the synchronization signal and reception of the response signal is measured by a synchronization device in the data source, with the measured time difference essentially being twice the signal propagation time. In this way, the signal propagation time between the control device and the data source is determined from the measured time difference. On the basis of the measured signal propagation time, a transmission delay time is set in the data source, with the data which are to be transmitted being delayed by the transmission delay time.

This method has the advantage that, in contrast to the previous methods, the signal propagation time from the control device to the data source is measured by the data source and not by the control device, which means that the previously necessary transfer of the measured signal propagation time or transmission delay time from the control device to the data source is dispensed with. The control device is thus simpler to implement, since commands concerning the transfer of the propagation time data ascertained in this way are dispensed with. The data sources can likewise be implemented more simply, since it is not necessary to provide any external access capabilities to internal registers containing the ascertained latencies. The functions saved as a result lead to reduced circuit complexity and hence to a simplified design and space saving.

Another advantage is obtained because for possible applications (for example for communication between a computer's memory controller and the memory modules) it is normal to incorporate the control device into the system permanently, whereas the data sources can be interchanged and can be plugged into any desired points of the bus system via plug contacts. This limits the task of the control device to initiating measurement of the latencies through the use of a command. In the rest of the synchronization process, it is merely necessary for all the signals arriving at the control device to be returned unchanged. This can be implemented, by way of example, by a fully passive control device if the latter is not terminated with the correct impedance. The abrupt impedance change results in a completely reflected signal wave which can be evaluated as a response signal. This makes it possible for the control device not to need to have any knowledge about the specific method used during measurement of the latencies. As a result, when the data sources are changed, the measurement method implemented thereon can also be replaced by one which may be more advantageous.

In general terms, the invention moves the problem of measuring the latencies from the control device to the data source. If each data source itself ascertains and stores the necessary delay times, then it is no longer necessary to make the latency externally programmable, which means that it is possible for the control device to dispense with additional commands for setting these delay times.

The response signal can preferably be a synchronization signal reflected at one end of the bus system. This can easily be achieved by arranging the control device at one end of the bus system and not terminating it with the correct impedance. An incoming signal is then reflected at this termination. In this case, it is necessary to remember that another end of the bus system is terminated with the correct impedance, which means that there is no reflection of the respective signal at that point. This method has the advantage that it is possible to dispense with a separate device for responding to the synchronization signal in the control device, and hence this method even works with a passive control device.

It is likewise possible for the response signal to be output by the control device as a response to the synchronization signal.

In one preferred embodiment, provision can be made for the transmission delay time to be ascertained by subtracting the measured time difference from a prescribed latency. The prescribed latency can be a latency which is greater under all circumstances than the greatest one arising in the bus system, i.e. the signal propagation time from that data source whose signal propagation time is greatest to the control device. Normally, the prescribed latency is thus the time which corresponds to the signal propagation time for the data source which is furthest away from the control device and whose signal propagation time is greatest. In this way, with a variable bus system, the delay time can always be set to correspond to the delay time for the data source which is furthest away from the control device.

This has the advantage that too long a delay time is not set unnecessarily.

With the objects of the invention in view there is also provided, a method for synchronizing a data exchange between a data source and a control device via a bus system, the method includes the steps of:

transmitting, via the bus system, a synchronization request signal to a plurality of data sources;

ascertaining a first time at which the synchronization request signal is received;

transmitting a synchronization signal from a data source having received the synchronization request signal last;

ascertaining a second time at which the synchronization signal is received; and setting a transmission delay time in each of the plurality of data sources in dependence of a time difference between the first time and the second time such that data to be transmitted are delayed by the transmission delay time.

In other words, in accordance with another aspect of the present invention, during synchronization of data exchange between a plurality of data sources and a control device, the invention can also provide for each of the data sources first to establish a first time at which the synchronization request signal transmitted by the control device is received, and then for the data source which received the synchronization request signal last to transmit a synchronization signal. Each of the data sources then measures the second time at which the synchronization signal is received and sets a transmission delay time on the basis of the first time and the second time.

This also makes it possible to keep the delay time for the signals as short as possible, since the delay time for the end data source can essentially be set to zero. The respective other data sources are then synchronized to the signal propagation time between the end data source and the control device, and not to the control device, so that the signal propagation time between the end data source and the control device determines the delay time for the data for all the data sources connected to the bus system.

Another mode of the method according to the invention includes setting the transmission delay time for the data sources to a time period substantially corresponding to the time difference between the first time and the second time.

With the objects of the invention in view there is also provided, a bus configuration, including:

a bus system including a data source and a control device for controlling a data communication on the bus system;

the control device having a tuning device for transmitting a synchronization request signal via the bus system;

the data source having a synchronization device with a time measurement unit, the time measurement unit measuring a time difference between a first signal and a second signal transmitted as a response to the first signal in order to determine a signal propagation time between the control device and the data source; and the synchronization device having a delay device in order to delay data to be transmitted by a transmission delay time dependent on the time difference measured with the time measurement unit.

In other words, in accordance with another aspect of the present invention, a bus system having a control device and at least one data source is provided. The control device is used to control the data communication on the bus system and also has a tuning device or adjusting device in order to produce a synchronization request signal and to transmit it via the bus system after the data sources need to perform synchronization. To this end, the data source has a synchronization device.

The synchronization device for the data source has a time measurement unit in order to measure a time difference between a first signal and a second signal transmitted by the control device as a response to the first signal. In this way, the signal propagation time between the control device and the respective data source is determined. The synchronization device for the data source also has a delay device in order to delay data which are to be transmitted on the basis of a transmission delay time which depends on the measured time difference.

Such a bus system makes it a simple matter to synchronize data transfer. In this context, the synchronization operation, i.e. measurement of the signal propagation times from the control device to the data source, is effected in the data source and not in the control device, which means that the advantages described above are obtained, namely the reduction in complexity for circuits which concern the transfer of latencies from the control device to the data source.

According to another feature of the invention, the bus system has an end reflecting the first signal such that the second signal is the first signal reflected at the end of the bus system.

According to another feature of the invention, the tuning device is configured to output the second signal as a response to the first signal produced by the tuning device.

According to another feature of the invention, the delay device is configured to delay the data to be transmitted by a time period dependent on a given latency.

According to another feature of the invention, the bus system includes further data sources; and the data source and the further data sources have respective signal propagation times, a longest one of the signal propagation times is the given latency.

With the objects of the invention in view there is also provided, a bus configuration, including:

a bus system including a first data source, a second data source and a control device for controlling a data communication on the bus system;

the control device having a tuning device for transmitting a synchronization request signal via the bus system;

the first and second data sources each having a respective synchronization device;

the synchronization device of the second data source being configured to output a synchronization signal as a response to the synchronization request signal;

the synchronization device of the first data source having a time measurement unit, the time measurement unit measuring a time difference between the synchronization request signal and the synchronization signal transmitted from the second data source in order to determine a signal propagation time between the first data source and the second data source; and the synchronization device of the first data source having a delay device in order to delay data to be transmitted by a transmission delay time dependent on the time difference measured with the time measurement unit.

In other words, in accordance with another aspect of the present invention, a bus system having a control device for controlling the data communication on the bus system with a first and a second data source is provided. The control device has a tuning device in order to transmit a synchronization request signal via the bus system. The first and second data sources each have a synchronization device, with the synchronization device for the second data source being designed so as to output a synchronization signal as a response to the synchronization request signal. The synchronization device for the first data source has a time measurement unit in order to measure a time difference between the synchronization request signal and the synchronization signal transmitted by the second data source. In this way, the signal propagation time between the first data source and the second data source is determined. The synchronization device for the first data source has a delay device in order to delay data which are to be transmitted on the basis of a transmission delay time which depends on the measured time difference.

An advantage of this embodiment is that the data which are to be transmitted are determined essentially only by the signal propagation time to the second data source, which is preferably a data source arranged at the end of the bus system. In this case, the settings for the delay devices for the first data source or for the first data sources are not geared to the signal propagation time to the control device but rather to the signal propagation time between the second data source and the respective first data source. In this way, the control device sees, for each signal, a delay time which a signal would have if it were transmitted by the second data source. Such a bus system has the advantage that each data source can align the delay time for the signals on a case by case basis, which allows the bus system to be operated in optimum fashion for the respective configuration in each case.

According to another feature of the invention, the second data source is disposed in the bus system such that the second data source receives the synchronization request signal last.

With the objects of the invention in view there is also provided, in a bus system including a control-device for controlling a data communication, the control device having a tuning device for transmitting a synchronization-request signal via the bus system, a data source which includes:

a synchronization device with a time measurement unit, the time measurement unit measuring a time difference between a first signal and a second signal transmitted as a response to the first signal in order to determine a signal propagation time between the control device and the data source;

the synchronization device having a delay device in order to delay data to be transmitted by a transmission delay time dependent on the time difference measured with the time measurement unit; and the synchronization device transmitting the first signal as a synchronization signal for the data source.

With the objects of the invention in view there is also provided, in a bus system including a data source having a synchronization device with a time measurement unit, the synchronization device transmitting a first signal as a synchronization signal for the data source, the time measurement unit measuring a time difference between the first signal and a second signal transmitted as a response to the first signal in order to determine a signal propagation time, the synchronization device having a delay device in order to delay data to be transmitted by a transmission delay time dependent on the time difference measured with the time measurement unit, a control device for controlling a data communication, including:

a tuning device for transmitting a synchronization request signal via the bus system.

Other features which are considered as characteristic for the invention are set forth in the appended claims.

Although the invention is illustrated and described herein as embodied in a method and a bus system for synchronizing a data exchange between a data source and a control device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
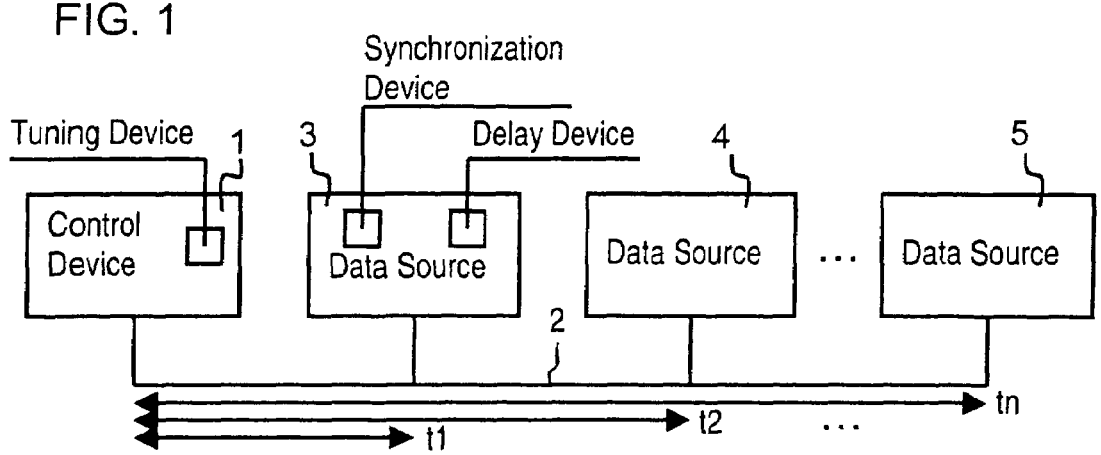
FIG. 1 is a schematic block diagram of a bus system having a control device and a plurality of data sources according to the invention.

Referring now to the figures of the drawings in detail and first, particularly, to FIG. 1 thereof, there is shown a bus system having a control device 1 and a bus line 2, to which a first data source 3, a second data source 4 and a third data source 5 are connected. Data on this bus system are preferably transmitted from the data sources 3, 4, 5 to the control device 1 or from the control device 1 to a respective addressed data source 3, 4, 5. Data transfer between the first, second and third data sources 3, 4, 5 can likewise be possible. When transmitting and receiving data transmitted via the bus system, propagation time-related signal delays occur which interfere with the synchronization of signals.

So that the data are transferred via the bus system without any loss of synchronization, the data sources 3, 4, 5 contain delay elements which delay data which are to be transmitted, so that the signal delay by the respective delay element and the signal propagation time to the control device respectively cause an essentially equal latency for each of the data sources 3, 4, 5. As a result, the control device 1 knows that a transmitted data item can be received after a predetermined latency. The delay element in each data source 3, 4, 5 can be set individually for this purpose. The delay time is preferably set in latency registers.

An embodiment of a method in accordance with the invention is shown in FIGS. 2A to 2D.

Figure 2A:
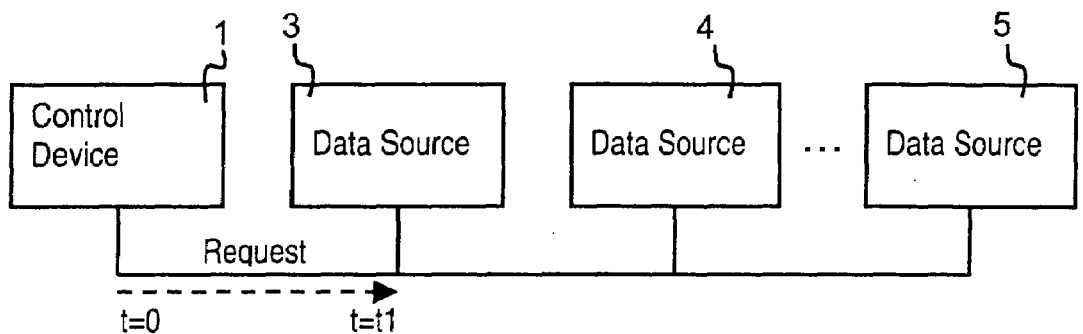
FIGS. 2A to 2D are schematic block diagrams for illustrating a method for synchronizing a bus system according to a first embodiment of the invention.

FIG. 2A shows how the control device outputs a synchronization request signal to the bus system via the bus line. The synchronization request signal is normally implemented following a startup of the bus system, i.e. after the supply voltage is applied. The control device and the data sources need to be synchronized to one another in order to ensure a reliable data transfer. For this reason, the control device 1 initiates the synchronization operation before data transfers start.

Figure 2B:
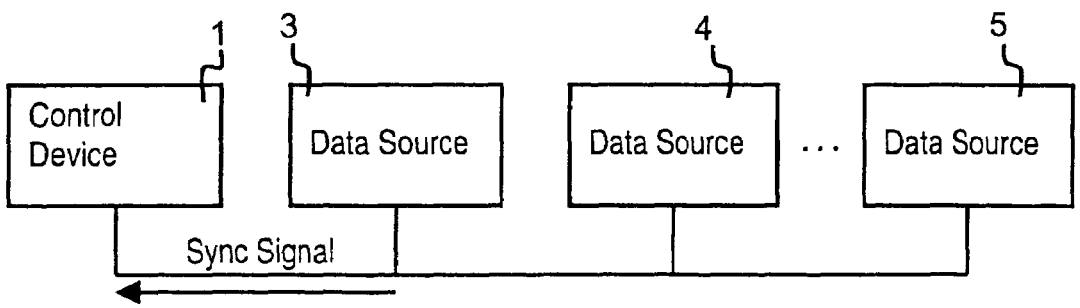

FIG. 2B shows how the first data source 3 outputs a synchronization signal onto the bus system as a response to the synchronization request signal. When the synchronization signal has been output, the first data source 3 waits for a response signal. The response signal can, by way of example, be a reflected synchronization signal which is reflected at an input of the control device 1 which is not terminated with the correct impedance. It is likewise possible for the control device 1 to receive the synchronization signal and to generate a corresponding response signal.

Figure 2C:
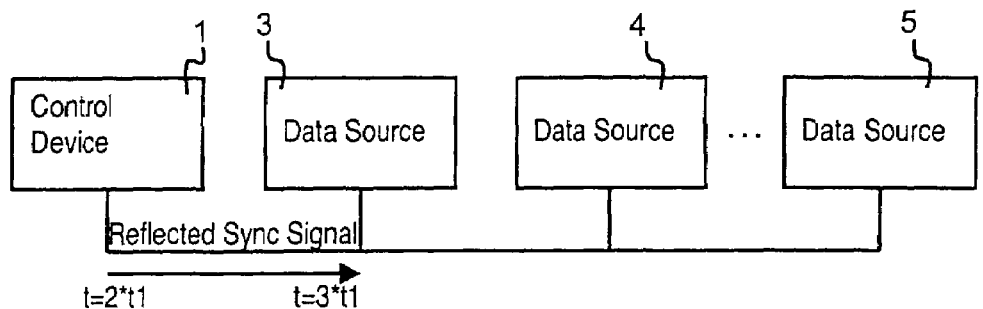
Figure 2D:
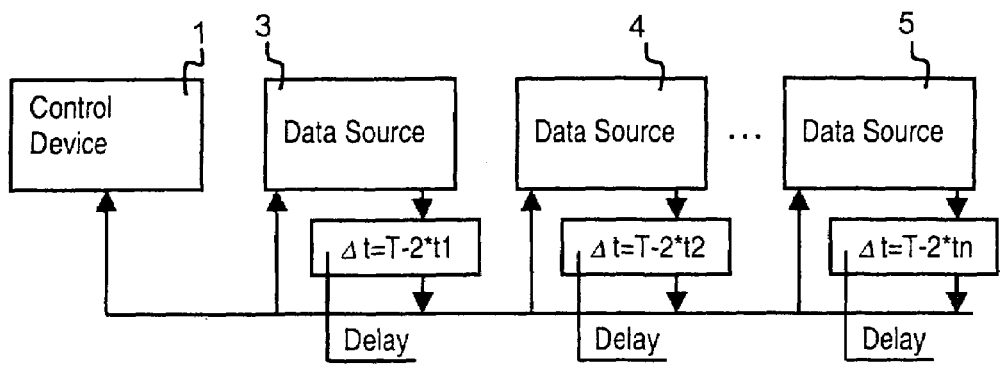

As FIG. 2C shows, the first data source 3 receives the response signal after a time which corresponds approximately to twice the signal propagation time for signals between the first data source 3 and the control device 1.

Like the first data source 3, the second data source 4 and the third data source 5 also generate a synchronization signal as a response to the synchronization request signal which has been transmitted by the control device 1 initially. On account of the synchronization request signal being received by the data sources 3, 4, 5 at different times, the synchronization signals are transmitted by the data sources 3, 4, 5 at different times, so that they do not overlap. In cases in which these propagation time differences might be too small, however, it is also possible to request the individual data sources 3, 4, 5 selectively in succession. Every time the control device 1 receives a synchronization signal, a response signal is generated or the synchronization signal is reflected at an input of the control device 1 which is not terminated with the correct impedance. Since each of the data sources 3, 4, 5 transmits its own synchronization signal, they can always identify the time after which the response signal is received again. Between transmission of the synchronization signal and reception of the response signal, the time period corresponding to approximately twice the signal propagation time $ti$ ($i=1, 2, 3 \ldots$) for signals between the respective data source 3, 4, 5 and the control device 1 is measured.

Each of the data sources 3, 4, 5 then sets a respective time delay $\Delta T1$, $\Delta T2$, $\Delta T3$ for all its transmitted data to a value $\Delta Ti$ ($i=1, 2, 3 \ldots$), which corresponds to $$\Delta Ti = T - 2 \times ti \ (i=1, 2, 3 \ldots).$$

In this case, T is a stipulated propagation time prescribed by the system and describes the time after which the control device expects the data from an arbitrary data source 3, 4, 5 to arrive. T is chosen such that each of the data sources 3, 4, 5 connected to the bus system can transmit a signal to the control device 1 in this time in all cases. To keep the delay for data as short as possible, it is appropriate to set T such that, during this time, data from the data source which is furthest away from the control device (in the example shown, the third data source 5) can only just be received in synchronized fashion. $ti$ ($i=1, 2, 3$) is the measured signal propagation time between the control device 1 and the respective data source 3, 4, 5.

One advantage of the invention is that the signal propagation time $ti$ is measured by the data sources 3, 4, 5 and not by the control device 1. Previously necessary transfer of measured signal propagation times from the control device 1 to the respective data source 3, 4, 5 is thus dispensed with.

Commands concerning the transfer of the propagation time data ascertained in this manner can thus be dispensed with.

Another advantage of the invention is that the control device 1 can be provided without any delay elements and is thus capable of controlling any number of data sources without the latter's number being limited by the number of delay elements provided in the control device 1.

Another embodiment of the method according to the invetion is shown in FIGS. 3A to 3D. As before, the bus system has a control device 1 and a first, a second and a third data source 3, 4, 5. The data sources 3, 4, 5 each have a time measurement device which is suitable for measuring relative time differences.

Figure 3A:
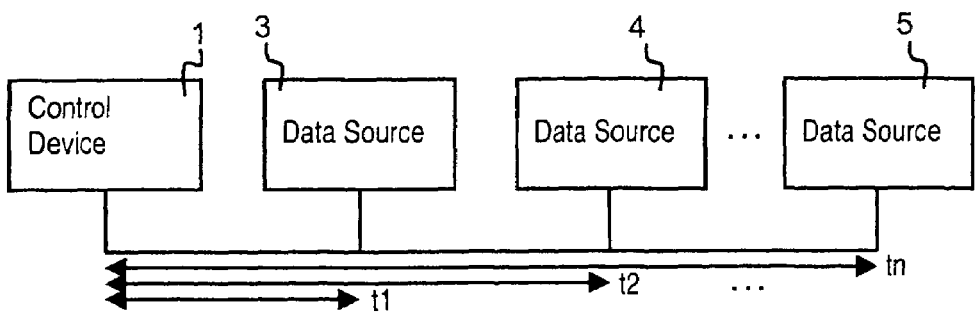
FIGS. 3A to 3D are schematic block diagrams for illustrating a method for synchronizing a bus system according to a second embodiment of the invention.
Figure 3B:
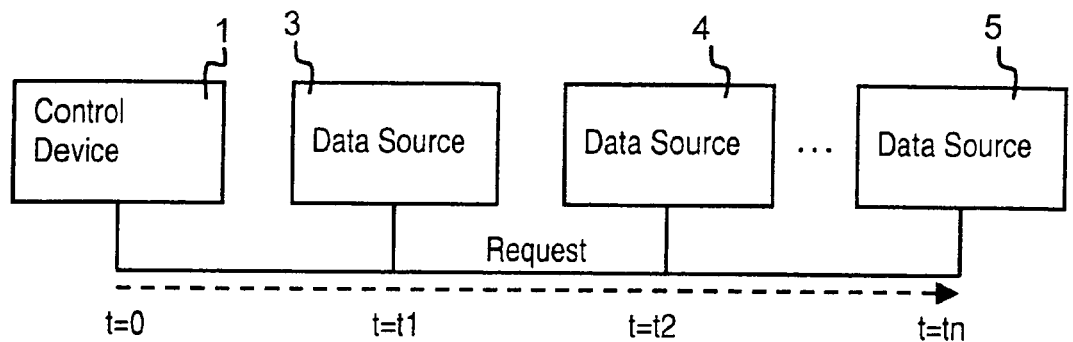
Figure 3C:
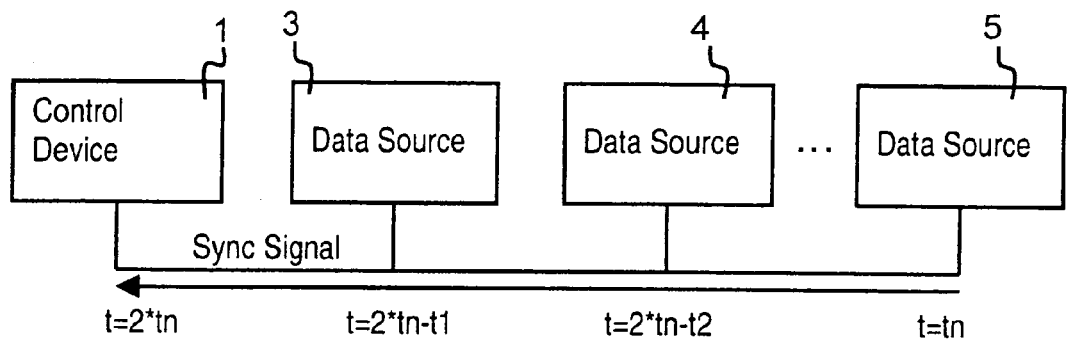
Figure 3D:
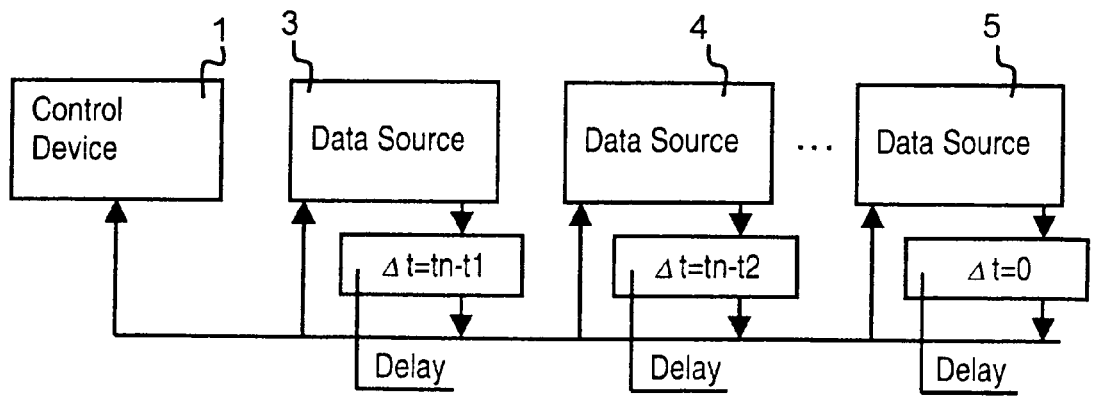

To synchronize the bus system, the control device 1 transmits, as before, a synchronization request signal to the bus system via the bus line, the synchronization request signal consequently being received by all the data sources 3, 4, 5. As FIG. 3B shows, the data sources 3, 4, 5 respectively measure the time t1, t2, t3 at which the synchronization request signal is received. In contrast to the exemplary embodiment shown previously, however, the synchronization request signal is used to address only the last data source 5 on the bus system, i.e. only the data source whose signal propagation time to the control device is greatest.

Following reception of the synchronization request signal, the last data source 5 immediately transmits a synchronization signal to the control device 1. The synchronization signal arrives at the control device 1 at the time $2 \times Tn$ ($n=3$ in the example chosen). All the data sources 3, 4 in between, for their part, measure the time at which the synchronization signal transmitted by the third data source 5 arrives. The difference between the two measured times is thus exactly twice the signal propagation time from one of the data sources 3, 4 to the last (third) data source 5.

Next, each data source 3, 4, 5 sets a time delay $\Delta Ti$ ($i=1, 2, 3 \ldots$) for all its dispatched data to the value $\Delta Ti = Tn - ti$.

This embodiment of the invention has the advantage that the total latency of the bus system does not necessarily need to be firmly prescribed. The total latency can be geared to the length of the bus and to the number of data sources connected thereto. The control device can determine the total propagation time for the bus from the time $T = 2 Tn$ which is the arrival of the synchronization signal. The control device 1 thus expects the arrival of data, irrespective of the addressed data source, after a propagation time $2 \times Tn$ following transmission of the data request.

In the case of the two previous exemplary embodiments, for the sake of simplicity it has been assumed that the data source 3, 4, 5 starts to measure the signal propagation times immediately, i.e. without a time delay, after reception of the synchronization request signal. A similar situation has been assumed for the control device 1, which would return the synchronization signal transmitted by the data source without any time delay. If the reaction times of the control device 1 and of the data sources 3, 4, 5 are not negligible, however, these times need to be determined previously and taken into account when calculating the delay times for the data which are to be transmitted.

The methods can also be applied when transfer of signals via the bus system does not involve data signals which are related to a sync signal.

The features of the invention which are disclosed in the description above, in the claims and in the drawings can be significant both individually and in any desired combination for the purpose of implementing the invention in its various embodiments.

I claim:

1. A method for synchronizing a data exchange between a data source and a control device via a bus system, the method which comprises:
    transmitting, via the bus system, a synchronization request signal to a plurality of data sources;
    ascertaining a first time at which the synchronization request signal is received;
    transmitting a synchronization signal from a data source having received the synchronization request signal last;
    ascertaining a second time at which the synchronization signal is received; and
    setting a transmission delay time in each of the plurality of data sources in dependence of a time difference between the first time and the second time such that data to be transmitted are delayed by the transmission delay time.

2. The method according to claim 1, which comprises setting the transmission delay time to substantially zero for the data source having received the synchronization request signal last.

3. The method according to claim 1, which comprises setting the transmission delay time for the data sources to a time period substantially corresponding to the time difference between the first time and the second time.

4. A bus configuration, comprising:
    a bus system including a data source and a control device for controlling a data communication on said bus system;
    said control device having a tuning device for transmitting a synchronization request signal via said bus system;
    said data source having a synchronization device with a time measurement unit, said time measurement unit measuring a time difference between a first signal and a second signal transmitted as a response to the first signal in order to determine a signal propagation time between said control device and said data source; and
    said synchronization device having a delay device in order to delay data to be transmitted by a transmission delay time dependent on the time difference measured with said time measurement unit.

5. The bus configuration according to claim 4, wherein said synchronization device transmits the first signal as a synchronization signal for said data source.

6. The bus configuration according to claim 4, wherein said bus system has an endreflecting the first signal such that the second signal is the first signal reflected at said end of said bus system.

7. The bus configuration according to claim 4, wherein said tuning device is configured to output the second signal as a response to the first signal produced by said tuning device.

8. The bus configuration according to claim 4, wherein said delay device is configured to delay the data to be transmitted by a time period dependent on a given latency.

9. The bus configuration according to claim 8, wherein:
    said bus system includes further data sources; and
    said data source and said further data sources have respective signal propagation times, a longest one of the signal propagation times is the given latency.

10. A bus configuration, comprising:
    a bus system including a first data source, a second data source and a control device for controlling a data communication on said bus system;
    said control device having a tuning device for transmitting a synchronization request signal via said bus system;
    said first and second data sources each having a respective synchronization device;
    said synchronization device of said second data source being configured to output a synchronization signal as a response to the synchronization request signal;
    said synchronization device of said first data source having a time measurement unit, said time measurement unit measuring a time difference between the synchronization request signal and the synchronization signal transmitted from said second data source in order to determine a signal propagation time between said first data source and said second data source, and
    said synchronization device of said first data source having a delay device in order to delay data to be transmitted by a transmission delay time dependent on the time difference measured with said time measurement unit.

11. The bus system according to claim 10, wherein said second data source is disposed in said bus system such that said second data source receives the synchronization request signal last.

12. In a bus system including a control device for controlling a data communication, the control device having a tuning device for transmitting a synchronization request signal via the bus system, a data source comprising:
    a synchronization device with a time measurement unit, said time measurement unit measuring a time difference between a first signal and a second signal transmitted as a response to the first signal in order to determine a signal propagation time between the control device and the data source;
    said synchronization device having a delay device in order to delay data to be transmitted by a transmission delay time dependent on the time difference measured with said time measurement unit; and
    said synchronization device transmitting the first signal as a synchronization signal for the data source.

* * * * *